Patented Nov. 20, 1934

1,981,176

UNITED STATES PATENT OFFICE

1,981,176

LIGNIN DERIVATIVES AND PROCESS OF MAKING SAME

Guy C. Howard, Wausau, Wis.

No Drawing. Application October 22, 1930, Serial No. 490,557

18 Claims. (Cl. 260—2)

This invention is a continuation and division in part of my patent application Serial No. 460,150 filed June 10th, 1930, and relates to the production, from waste sulphite liquor or equivalent liquor, of lignin derivatives one of which, among other properties, is characterized by having a jet black color even when in finely pulverized form.

Waste sulphite liquor is a liquor resulting from the production of paper pulp from wood or other vegetable material by the acid sulphite cooking process and contains various inorganic and organic materials in dissolved form. Some of these dissolved substances are derived from the cooking acid used in the pulping process and others are organic substances which have been dissolved from the wood.

When such waste sulphite liquor is treated with caustic lime in solid phase form a material amount of its sulphur content can be precipitated and removed as calcium sulphite substantially free from organic matter, almost all of the lignin component of said liquors can be precipitated and removed in a solid form which is substantially free from the carbohydrate substances existing in said waste sulphite liquor, and the residual liquid effluent will contain, in dissolved form, substantially all the aforesaid carbohydrate components together with a residual minor amount of the lignin substance in soluble form together with a material amount of the sulphur content of said waste sulphite liquor likewise in dissolved form.

More specifically I have found that waste sulphite liquor can be advantageously segregated into these aforesaid products by treatment with caustic lime in solid phase form according to my patented processes of U. S. Reissue Patent No. 18,268, dated December 1, 1931, and Patent No. 1,856,553, dated May 3, 1932.

It is the solid lignin-containing material as obtained in this or equivalent manner with which this present invention is primarily concerned in making the aforesaid desirable lignin derivatives.

This solid lignin-containing material is substantially free from carbohydrate substances and contains both sulphur and lime compounds. Normally it contains sulphur (exclusive of any sulphates) in a ratio of 32 parts of sulphur to approximately 500 parts of lignin substance and contains in excess of 56 parts of CaO to 32 parts of sulphur and to 500 parts of lignin substance. (The expression "500 parts of lignin substance" as used in this application is intended to mean a unit combining weight of lignin substance relative to its organically combined sulphur content and is based on tests which indicate such unit combining weight to be around 500 parts by weight of lignin substance to 32 parts of sulphur). This material is believed to be largely a lignin substance with which both sulphur and lime are combined in the ratio of 32 parts of sulphur to 56 or more parts of CaO but that such material as normally made contains minor amounts of inorganic calcium sulphite and some organic component which is either sulphur free or of lower organically combined sulphur content. There is always materially more CaO present than required for a $CaSO_3$ ratio of 56 parts of CaO to 32 parts of sulphur and the amount of this excess is somewhat variable. Some of this is undoubtedly present as free caustic lime but a majority of such excess is believed to be present in the form of the calcium salts of weak organic acid groups.

The organically combined sulphur is believed to be present as a sulphonic acid group (i. e. $.SO_3H$) attached to the lignin substance and part of the CaO to exist as the salt of such acid group. The material is alkaline and normally has a pH value materially above 10.5. If its pH value is lowered by addition of an acid having a strength equal to or greater than carbonic acid it will dissolve to an aqueous solution containing organically combined sulphur in a ratio approximating 32 parts of sulphur to 500 parts of the lignin substance but the amount of organically combined CaO will vary with the pH value. It can also be dissolved by various other means to yield aqueous solutions which are characterized by the above sulphur to organic matter ratio but which may be of either acid or alkaline pH value and which may vary both as to the amount of and specific base organically combined.

A lignin-containing substance of this acidic character and relatively fixed content of organically combined sulphur, viz, 32 parts of organically combined sulphur to approximately 500 parts of lignin substance, is for convenience referred to as "lignin-sulphonic acid" and various salts thereof are referred to as salts of such acid.

I have found that the salts of such lignin-sulphonic acid and the free lignin-sulphonic acid differ markedly as regards the detachment of the organically combined sulphur from the lignin substance and its removal in the form of gaseous sulphur dioxide. For example, when an aqueous solution of the salts of lignin-sulphonic acid is heated to dryness under conditions where the partial pressure content of sulphur dioxide ($SO_2$)

in the gaseous phase in contact with such salt solution is zero or essentially so the tendency of such salts to decompose and lose their organically combined sulphur as $SO_2$ is practically nil. On the other hand when an aqueous solution of the free lignin-sulphonic acid is heated under similar conditions, the free lignin-sulphonic acid tends to decompose and lose organically combined sulphur as $SO_2$ and such tendency persists under suitable conditions until around fifty per cent (50%) of the original sulphur content of the lignin-sulphonic acid has been so removed thus resulting in a product with around 32 parts of organically combined sulphur to approximately 1000 parts of organic matter derived from lignin substance.

According to either of two methods a free lignin-sulphonic acid solution which is free from organically combined base is first obtained by treating as primary intermediate raw material the solid lignin-containing material hereinbefore referred to and containing 32 parts of sulphur to approximately 500 parts of lignin substance and which is substantially free from carbohydrate substances, with an acid reagent, for example $H_2SO_4$ of suitable dilution, whereby solution of said material is effected and the pH value of the resulting solution is lowered to the desired point, for example to pH=1.0 at which point organically combined bases are effectively absent and free mineral acid not present in detrimental amounts. The precipitated $CaSO_4$ is removed from the solution.

According to one method the said solution is evaporated to complete or nearly complete dryness in contact with an atmosphere of, for example, air, or steam, or a mixture of both, which is continuously maintained in a condition of sufficiently low partial pressure content of $SO_2$ as to allow the escape of gaseous $SO_2$ from the solution.

According to the other method, the same solution is subjected to the same kind of heat treatment as in the method just described including contact with an atmosphere continuously maintained in a condition of sufficiently low partial pressure content of $SO_2$ as to allow the escape of gaseous $SO_2$ from the solution, and during such treatment and preferably after the solution has been heated, the hot solution is treated with a salting-out agent, for example, a concentrated solution of NaCl.

Both methods yield solid or semi-solid lignin products which are among the preferred secondary intermediate raw materials from which to produce by further suitable treatment the lignin derivatives which are the objective of this present invention.

Another suitable secondary intermediate raw material for the production of said desired lignin derivatives can be secured by a different treatment of the above mentioned primary intermediate raw material and will now be briefly described.

When the aforesaid primary intermediate raw material substantially free from carbohydrate substances as produced by the treatment of waste sulphite liquor with solid phase caustic lime in its concentrated wet solid form and either with or without the addition of more caustic lime reagent is given a steam pressure cook under conditions of caustic lime alkalinity, organically combined sulphur is split off from such lignin substance in the form of calcium sulphite to yield a lignin substance of diminished content in organically combined sulphur and under suitable conditions of pressure (temperature) for example, 40 lbs. gauge pressure and duration of cook, for example, four (4) hours such lignin product is insoluble in acids, such as cold aqueous sulphurous acid solutions and hydrochloric acid, which can function to dissolve out the admixed calcium sulphite and other inorganic compounds from the lignin material. Such material is found to be of diminished content in organically combined sulphur. The amount of such loss of sulphur will depend on the pressure (temperature) and duration of the cook and under moderate conditions of pressure and time as for example, the values above stated, it will yield a product with 32 parts of organically combined sulphur to 1000 parts or less of organic matter derived from lignin substance, but under higher pressures or longer treatment the sulphur loss can be made to go beyond a 32:1000 ratio. After the removal of admixed inorganic compounds by suitable acid treatment and preferably where the sulphur loss has not gone beyond that of approximately a 32:1000 ratio, the solid lignin product constitutes another suitable secondary intermediate raw material.

Suitable primary intermediate materials for the production of my new lignin derivatives may be defined as lignin-sulphonic acid compounds substantially free from carbohydrate substances, containing organically combined sulphur in a ratio of 32 parts of sulphur to approximately 500 parts of lignin substance, and preferably with a minimum of base combined with the acidic groups of such lignin-sulphonic acid compounds.

When a suitable primary intermediate lignin material, as defined above, is converted into any of the solid or semi-solid secondary intermediate raw material forms in the manners herein described and subjected to a heating or baking or roasting treatment under controlled conditions I have found that the resulting products will differ in definite respects depending on the specific conditions obtaining during such baking treatment, for example:

A. When such secondary intermediate raw materials are heated to a temperature of 300–350° C. for a sufficient time in the substantial absence of oxygen a product can be made which is characterized by having a pronounced black color—even when finely pulverized and which has other desirable properties.

B. When such secondary intermediate raw materials are heated to a temperature of 300–350° C. for a similar time but in the presence of an ample supply of oxygen and in the presence of a suitable catalyst such as NaCl a similar black product is not obtained but a product which has a brown color when finely pulverized.

C. When such secondary intermediate raw materials are heated in the presence of a limited and controlled supply of oxygen and in the presence of a suitable catalyst, such as NaCl, to a temperature of, for example, 200° C. (as indicated by thermometer adjacent to but not actually embedded in the material) a black product can be made but under such conditions an exothermic reaction has apparently taken place to some extent depending on the supply of oxygen and this has resulted in a substantial increase in the temperature of the material itself. This additional heat has apparently been obtained at the expense of the conversion of a minor amount of the material into the brown product, which in turn may or may not have been thereafter completely transformed into a black substance.

D. When the aforesaid brown product as made in the presence of ample oxygen and a suitable catalyst (Example B) is subsequently heated to 300-350° C. in the substantial absence of oxygen it is thereby converted into a black substance.

Many tests have been made to determine the essential conditions and the reactions involved in the making of these lignin derivatives and their characteristics, which have covered, for example, heating in the presence of varying amounts of oxygen and in the presence of nitrogen (absence of oxygen), varying the temperature conditions, heating with and without various catalytic substances such as chloride and sulphate salts, oxidizing reducing and condensing catalysts, heating in both acid and alkaline conditions, determining the amount and character of the evolved gaseous and vapor products from the heating treatment, analyzing the various solid products, evidences of exothermic reactions, heating with the addition of elemental sulphur, and so forth.

As a result of such tests it appears, (1) that the desirable lignin products of this invention are lignin derivatives with a diminished content of organically combined sulphur relative to such sulphur content prior to the heating treatment of the secondary intermediate raw materials. While such derivatives cannot be completely defined by their ratio of organically combined sulphur to organic matter, such ratio does apparently distinguish them from the ratios which characterize the lignin compounds that normally exist in the secondary intermediate forms mentioned above, namely, a ratio of 32 parts of organically combined sulphur to 1000 or less parts of organic matter, (2) that the formation of such final lignin derivatives involves a loss of organically combined sulphur beyond the 32:1000 ratio of secondary intermediate form products and the amount of such further sulphur loss is variable with the specific conditions of treatment but is believed to be normally such as is represented by organically combined sulphur to organic matter ratios ranging between 32:1000 and 32:2000, that such ratio range applies to both the black and the brown derivatives above referred to and hence cannot be used to distinguish them, (3) that in arriving at products having such ratios the material may pass through different stages of sulphur content and during such stages prior to reaching the said ratio of 32:1000 the diminution in said sulphur content is effected largely or entirely through its escape as $SO_2$ but that beyond such point the sulphur is removed largely in some form other than $SO_2$, probably as $H_2S$, $H_2SO_4$, mercaptan, or as a combination of such compounds and that concurrently certain organic reactions occur which alter the structure of the lignin molecule, (4) that the nature of the product depends on the manner in which organically combined sulphur beyond that represented by a 32:1000 ratio is split off and removed and also on changes in the organic matter accompanying, altho possibly independent of, this removal of sulphur, (5) that in making the black product $SO_2$ is evolved in the earlier stages of the heating and later $H_2S$, an oily material having a mercaptan-like odor, and a gas which is insoluble in caustic soda and burns with a blue flame are evolved, (6) that the evolution of $H_2S$ indicates a reduction of sulphur to a sulphide condition and implies a corresponding oxidation, presumably of the organic matter, (7) that the evolution of said combustible gas indicates decomposition of organic matter, (8) that when NaCl is present in the mixture being heated some HCl is evolved which would seem to indicate the presence in minor amounts of some strong acid such for example, as $H_2SO_4$, (9) that the presence of NaCl functions to catalyze some exothermic reaction between oxygen and the material under treatment, (10) that the substantial absence of oxygen and a temperature around 300-350° C. are favorable conditions for the formation of the desired black product, (11) that the presence of oxygen tends to yield the said brown product but that such brown product can be transformed into a black product by subsequent heating at suitable temperatures in the substantial absence of oxygen.

The steps involved in the process of making these said lignin derivatives are:

Step 1.—Subjecting waste sulphite liquor to treatment with solid phase caustic lime whereby a solid lignin-containing product containing organically combined sulphur but substantially free from carbohydrate substances (primary intermediate raw material) is obtained.

Step 2.—Converting such solid lignin-containing product into the desired solid or semi-solid secondary intermediate raw material forms in any of the manners hereinbefore described.

Step 3.—(a) Subjecting said secondary intermediate raw materials to a heating or baking treatment in suitable equipment, for example, a rotary kiln externally heated, in the substantial absence of oxygen and to a suitable temperature for example, 300-350° C. and for a predetermined time whereby a black product, as described, can be made.

Or (b) Subjecting said secondary intermediate raw material to a similar heat treatment in the presence of a limited and controlled supply of oxygen and in the presence of a catalyst such as NaCl, in similar equipment e. g. a rotary kiln which is externally heated to a temperature below 300° C. and in which an exothermic reaction takes place to effect a temperature of the material under treatment of 300-350° C. and for a predetermined time whereby a black product, as described, can be obtained.

Or (c) Subjecting said secondary intermediate raw material to a similar heat treatment in similar equipment which is externally heated to a lesser degree and in the presence of NaCl and an ample supply of oxygen (air) whereby a brown product, as described, can be obtained.

Step 4.—Treating a solid dry product from Step 3 with water or aqueous solutions, preferably acid solutions or with non-aqueous solvents, to effect primarily the removal of inorganic compounds by such leaching treatment.

Step 5.—Drying said leached material to a final product. The material is preferably ground to a finely pulverized form either prior to or after drying.

The black lignin derivative as produced in this manner is insoluble in water and when properly made does not change in water to a solid gelatinous (gel) form. It is insoluble in acids and practically insoluble in cold alkalies, is friable and can be ground easily to a jet black powder of unusual fineness, stability and having many other desirable properties.

The brown lignin derivative is similar in general characteristics but is distinguishable by its pronounced brown color.

The uses for such lignin derivatives are ordinarily such as depend upon their various properties such as insolubility, low ash content, low specific gravity, color, organic composition, susceptibility to fine grinding and so forth. For example, some of the uses which suggest themselves are as pigments in ink, paints and lacquers, as filler constituents and reactive agents in rubber goods, explosives, linoleums, molded products, as raw materials for the manufacture of other lignin derivatives and so forth.

I claim:

1. The process which comprises treating waste sulphite liquor with solid phase caustic lime to produce a solid lignin-sulphonic acid compound containing 32 parts of organically combined sulphur to approximately 500 parts of lignin substance and substantially free from carbohydrate substances, converting said solid lignin-sulphonic acid compound, by treatment involving a sulphur loss, into an intermediate material containing 32 parts of organically combined sulphur to organic matter within the range of 500 to 1000 parts, and converting said intermediate material, by treatment involving a sulphur loss, into a solid material containing 32 parts of organically combined sulphur to substantially more than 1000 parts of organic matter.

2. The process which comprises treating waste sulphite liquor with solid phase caustic lime to produce a solid lignin-sulphonic acid compound containing 32 parts of organically combined sulphur to approximately 500 parts of lignin substance and substantially free from carbohydrate substances, converting said solid lignin-sulphonic acid compound, by treatment involving a sulphur loss, into an intermediate material containing 32 parts of organically combined sulphur to organic matter within the range of 500 to 1000 parts, and converting said intermediate material, by treatment involving a sulphur loss, into a solid material containing 32 parts of organically combined sulphur to organic matter within the range of 1000 to 2000 parts.

3. The process of treating a solid salt of lignin-sulphonic acid containing 32 parts of organically combined sulphur to approximately 500 parts of lignin substance and substantially free from carbohydrate substances which comprises converting said salt of lignin-sulphonic acid, by treatment involving a sulphur loss, into an intermediate material containing 32 parts of organically combined sulphur to organic matter within the range of 500 to 1000 parts and converting said intermediate material into a solid material, by treatment involving a sulphur loss, containing 32 parts of organically combined sulphur to substantially more than 1000 parts of organic matter.

4. The process of treating a solid salt of lignin-sulphonic acid containing 32 parts of organically combined sulphur to approximately 500 parts of lignin substance and substantially free from carbohydrate substances which comprises converting said salt of lignin-sulphonic acid, by treatment involving a sulphur loss, into an intermediate material containing 32 parts of organically combined sulphur to organic matter within the range of 500 to 1000 parts and converting said intermediate material, by treatment involving a sulphur loss, into a solid material containing 32 parts of organically combined sulphur to organic matter within the range of 1000 to 2000 parts.

5. The process which comprises converting a salt of lignin-sulphonic acid, by treatment involving a sulphur loss, into a material having 32 parts of organically combined sulphur to organic matter within the range of 500 to 1000 parts, and in subjecting such material to heat treatment to cause a sufficient loss of sulphur to produce a solid material containing 32 parts of organically combined sulphur to substantially more than 1000 parts of organic matter.

6. The process which comprises converting a salt of lignin-sulphonic acid, by treatment involving a sulphur loss, into a material having 32 parts of organically combined sulphur to organic matter within the range of 500 to 1000 parts, and in subjecting such material to heat treatment to cause a sufficient loss of sulphur to produce a solid material containing 32 parts of organically combined sulphur to organic matter within the range of 1000 to 2000 parts.

7. The process of producing a lignin derivative which comprises heating a solution of free lignin-sulphonic acid substantially free from carbohydrate substances and simultaneously maintaining in contact therewith an atmosphere whose partial pressure content of $SO_2$ is sufficiently low to permit the escape of $SO_2$ from said solution until a material is obtained in which the ratio of organically combined sulphur to organic matter is substantially less than 32 to 500, and subjecting said material to heat treatment at a temperature of the order of 325° C. to thereby further substantially diminish the ratio of organically combined sulphur to organic matter.

8. The process of producing a lignin derivative which comprises heating an aqueous solution containing NaCl and free lignin-sulphonic acid substantially free from carbohydrate substances and simultaneously exposing the same to contact with an atmosphere whose partial pressure content of $SO_2$ is sufficiently low to permit the escape of $SO_2$ from said solution, continuing such exposure until sufficient organically combined sulphur has been removed as $SO_2$ to produce an organic material in which the ratio of organically combined sulphur to lignin substance is substantially less than 32 to 500, and subjecting such material in presence of NaCl to heat treatment at a higher temperature to thereby diminish the ratio of organically combined sulphur to organic matter to substantially less than 32 to 1000.

9. The process of producing a lignin derivative which comprises exposing a heated aqueous solution containing free lignin-sulphonic acid substantially free from carbohydrate substances to an atmosphere in which the partial pressure content of sulphur dioxide is sufficiently low to allow the escape of sulphur dioxide from such solution, and continuing such exposure until a substantial amount of organically combined sulphur has been removed as sulphur dioxide, and subjecting the resulting product to heat treatment of the order of 325° C. to thereby substantially further diminish the ratio of organically combined sulphur to organic matter.

10. The process of producing a lignin derivative which comprises exposing a heated aqueous solution containing free lignin-sulphonic acid substantially free from carbohydrate substances to an atmosphere in which the partial pressure content of sulphur dioxide is sufficiently low to allow the escape of sulphur dioxide from such solution, and continuing such exposure until a substantial amount of organically combined sulphur has been removed as sulphur dioxide, and subjecting the resulting product to heat treatment in presence of NaCl to thereby substantially further diminish the ratio of organically combined sulphur to organic matter.

11. The process of producing a lignin derivative which comprises exposing a heated aqueous solution containing free lignin-sulphonic acid substantially free from carbohydrate substances to an atmosphere in which the partial pressure content of sulphur dioxide is sufficiently low to allow the escape of sulphur dioxide, and continuing such exposure in presence of a salting-out agent until sufficient organically combined sulphur has been removed as sulphur dioxide to bring the organic sulphur content of the solution substantially below the ratio of 32 parts of organically combined sulphur to 500 parts of lignin substance, and subjecting the resulting product to heat treatment in presence of NaCl to thereby further diminish the ratio of organically combined sulphur to organic matter to substantially less than 32 parts of organically combined sulphur to 1000 parts of organic matter.

12. The process which comprises treating waste sulphite liquor with solid phase caustic lime to produce a solid lignin-sulphonic acid compound substantially free from carbohydrate substances and containing 32 parts of organically combined sulphur to approximately 500 parts of lignin substance, subjecting said matter to a steam pressure cook under conditions of caustic lime alkalinity to produce a material insoluble in cold aqueous solutions of sulphurous acid and containing 32 parts of organically combined sulphur to organic matter within the range of 500 to 1000 parts, subjecting such material to a suitable acid leach to remove admixed inorganic compounds and thereby yield a suitable intermediate material, and subjecting said intermediate material to heat treatment to produce a solid material containing 32 parts of organically combined sulphur to organic matter within the range of 1000 to 2000 parts.

13. The process which comprises subjecting to a steam pressure cook, under conditions of caustic lime alkalinity, a salt of lignin-sulphonic acid substantially free from carbohydrate substances and containing 32 parts of organically combined sulphur to approximately 500 parts of lignin substance to produce a solid material containing 32 parts of organically combined sulphur to organic matter within the range of 500 to 1000 parts, subjecting such material to a suitable acid leach to remove admixed inorganic compounds and thereby yield a suitable intermediate material, and subjecting said intermediate material to heat treatment to cause a sufficient loss of sulphur to produce a solid material containing 32 parts of organically combined sulphur to organic matter within the range of 1000 to 2000 parts.

14. A solid lignin derivative substantially free from carbohydrate substances and made by converting a salt of lignin-sulphonic acid, by treatment involving a sulphur loss, into a material containing 32 parts of organically combined sulphur to substantially more than 1000 parts of organic matter.

15. A solid lignin derivative substantially free from carbohydrate substances and made by converting a salt of lignin-sulphonic acid, by treatment involving a sulphur loss, into a material of a pronounced black color and containing 32 parts of organically combined sulphur to substantially more than 1000 parts of organic matter.

16. A solid lignin derivative substantially free from carbohydrate substances and made by converting a salt of lignin-sulphonic acid, by treatment involving a sulphur loss, into a material containing 32 parts of organically combined sulphur to substantially more than 1000 parts of organic matter but not more than 2000 parts of organic matter.

17. A solid lignin derivative substantially free from carbohydrate substances and made by converting a salt of lignin-sulphonic acid, by treatment involving a sulphur loss, into a material of a pronounced black color and containing 32 parts of organically combined sulphur to substantially more than 1000 parts of organic matter but not more than 2000 parts of organic matter.

18. A solid lignin derivative made by converting a salt of lignin-sulphonic acid, by treatment involving a sulphur loss, into a material of pronounced black color, easily grinding to powder, insoluble in acids, highly resistant to solution by alkalies, and containing 32 parts of organically combined sulphur to organic matter within the range of 1000 to 2000 parts.

GUY C. HOWARD.